United States Patent [19]

Lebensfeld

[11] Patent Number: 5,453,000
[45] Date of Patent: Sep. 26, 1995

[54] TOY VACUUM MOLDING APPARATUS

[75] Inventor: Steven Lebensfeld, Woodsburgh, N.Y.

[73] Assignee: Toymax Incorporated, Westbury, N.Y.

[21] Appl. No.: 113,800

[22] Filed: Aug. 30, 1993

[51] Int. Cl.⁶ .................................................. B29C 51/10
[52] U.S. Cl. .................... 425/152; 425/153; 425/170; 425/173; 425/388; 425/453; 425/DIG. 57
[58] Field of Search .......................... 425/DIG. 57, 388, 425/453, 151, 152, 153, 173, 163, 170

[56] References Cited

U.S. PATENT DOCUMENTS

| | | |
|---|---|---|
| 2,441,097 | 4/1948 | Hicks . |
| 2,814,074 | 11/1957 | Butzko . |
| 3,041,669 | 7/1962 | Marshall et al. . |
| 3,179,980 | 4/1965 | Ryan et al. . |
| 3,616,494 | 11/1971 | Natter ............................. 425/DIG. 57 |
| 3,649,152 | 3/1972 | Knack, Sr. ............................ 425/388 |
| 3,822,978 | 7/1974 | Nichols .................................. 425/388 |
| 3,852,014 | 12/1974 | Kimball et al. ...................... 425/388 |
| 3,873,659 | 3/1975 | Smith ..................................... 425/388 |
| 3,887,321 | 6/1975 | Hijikata et al. ...................... 425/388 |
| 3,907,482 | 9/1975 | Shiota et al. ......................... 425/453 |
| 4,087,224 | 5/1978 | Moser ..................................... 425/388 |
| 4,102,964 | 7/1978 | Ridgeway ............................ 425/388 |
| 4,157,884 | 6/1979 | Andrae .................................. 425/173 |
| 4,215,843 | 8/1980 | Gay et al. ............................... 249/78 |
| 4,299,548 | 11/1981 | Saffer et al. ..................... 425/DIG. 57 |
| 4,363,617 | 12/1982 | Hirsekorn ............................ 425/388 |
| 4,764,241 | 8/1988 | Makino .................................. 425/388 |
| 4,836,762 | 6/1989 | Davis, Jr. ............................... 425/388 |
| 4,894,000 | 1/1990 | Coates, Jr. ............................. 425/190 |
| 5,015,167 | 5/1991 | Charles ................................. 425/388 |

*Primary Examiner*—Khanh Nguyen
*Attorney, Agent, or Firm*—Rosen, Dainow & Jacobs

[57] ABSTRACT

A toy apparatus and method for making vacuum formed articles wherein a thin sheet of plastic is secured on a mold in a first position the mold is moved to a second position adjacent a heater for heating and softening the plastic sheet and a vacuum is applied to the mold and heated sheet either while it is in the second position or after it is moved back to its original first position. The apparatus includes a transparent safety cover and a shuttle lever which in combination reduce the possibility of a child operator of this toy from burning his or her fingers. The safety cover, if open, bars movement of the mold to the heater and bars entry of fingers toward the heater, and if closed, bars touching the mold, plastic sheet or heater. Following closure of the safety cover a first lever may be moved to drive the mold to the heater and a second lever may be moved to actuate the vacuum pump. The safety cover cannot be re-opened until the shuttle lever is returned to its start position.

46 Claims, 13 Drawing Sheets

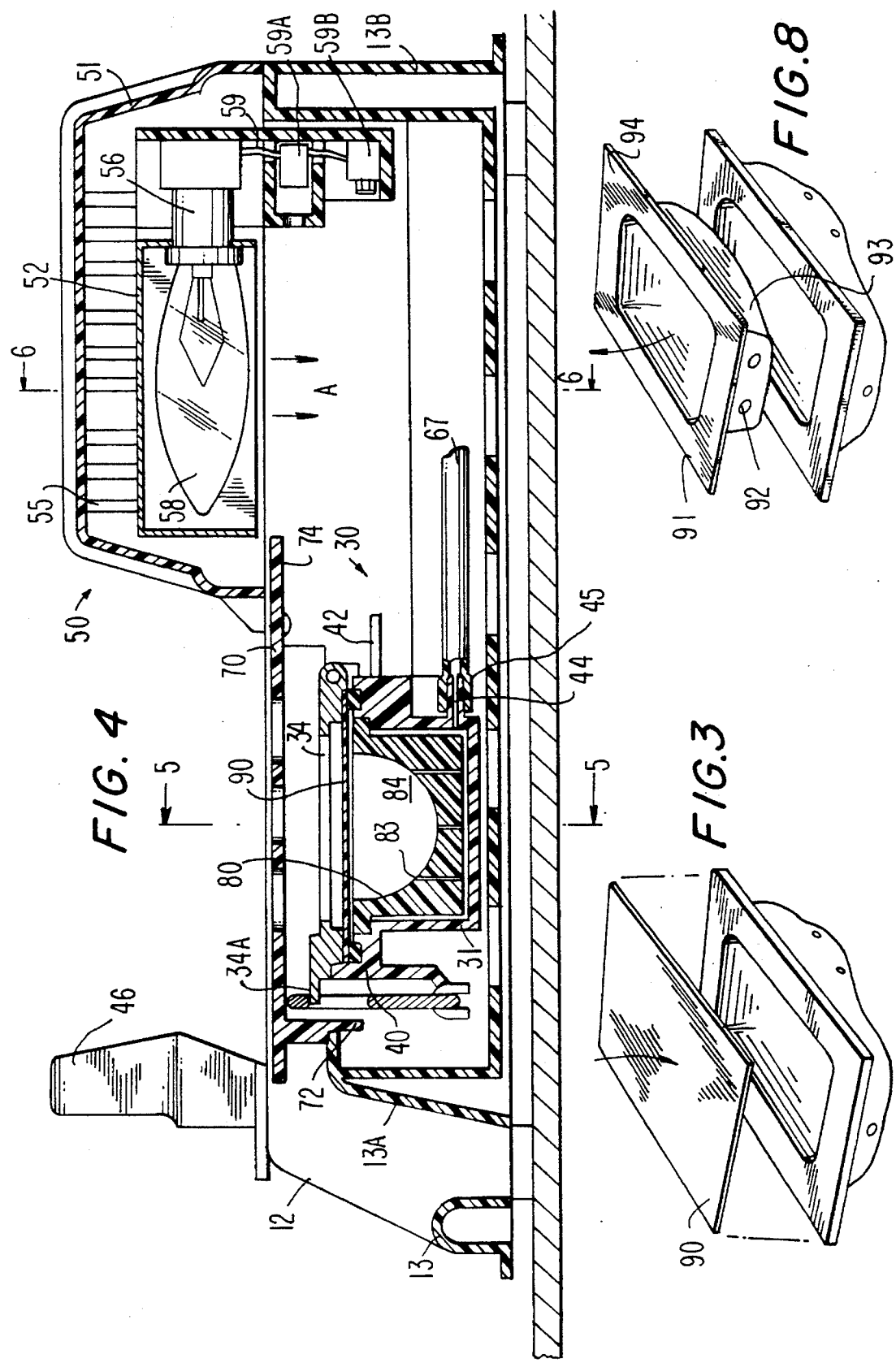

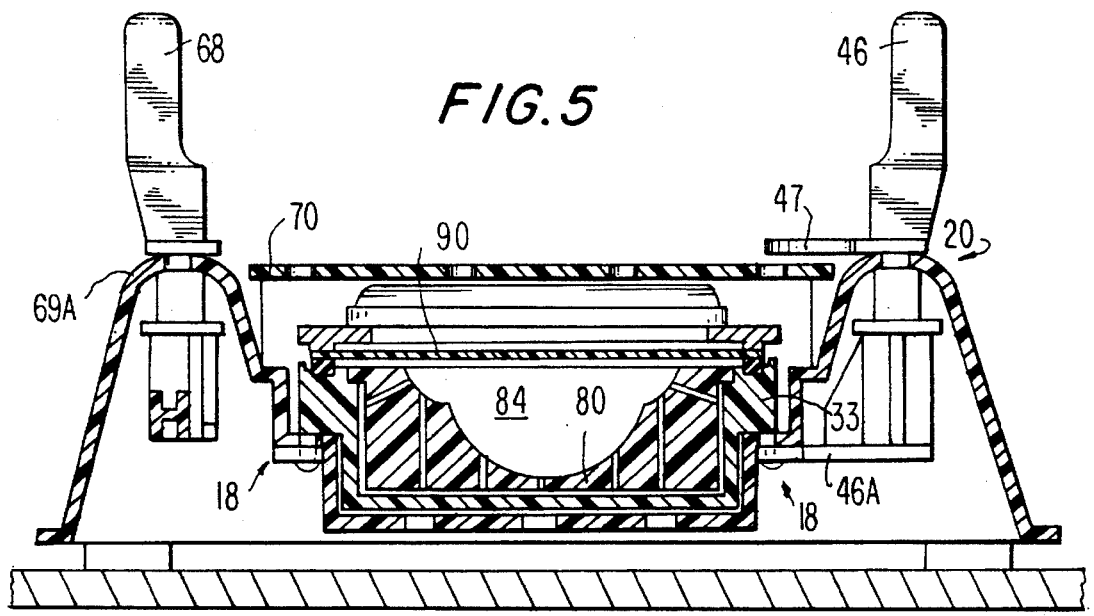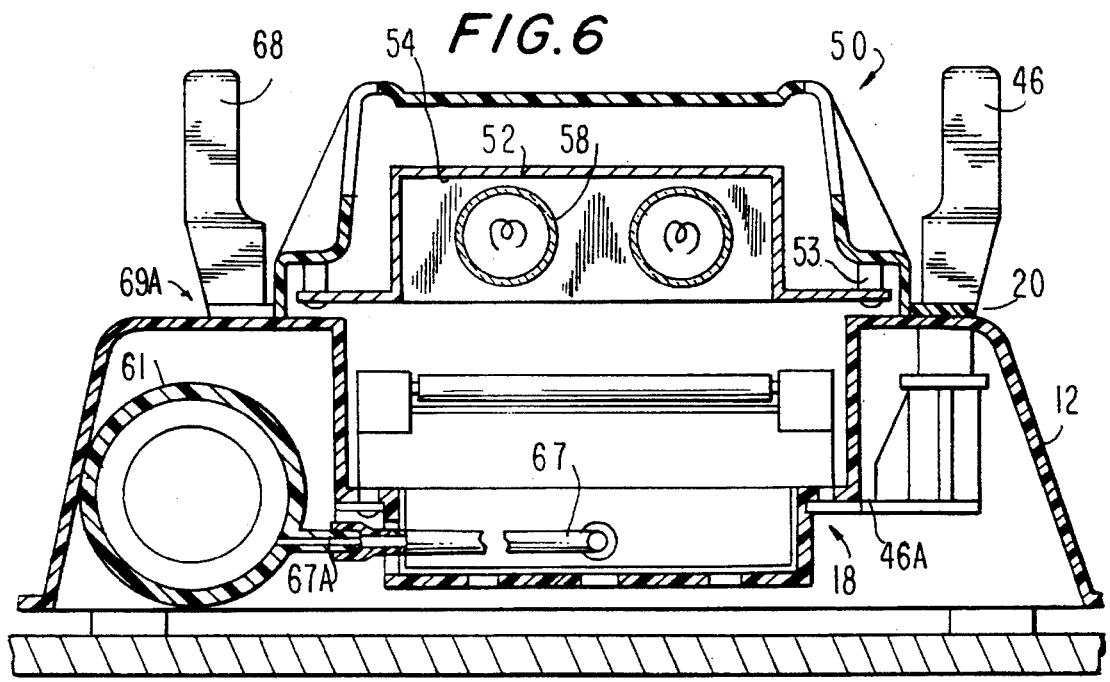

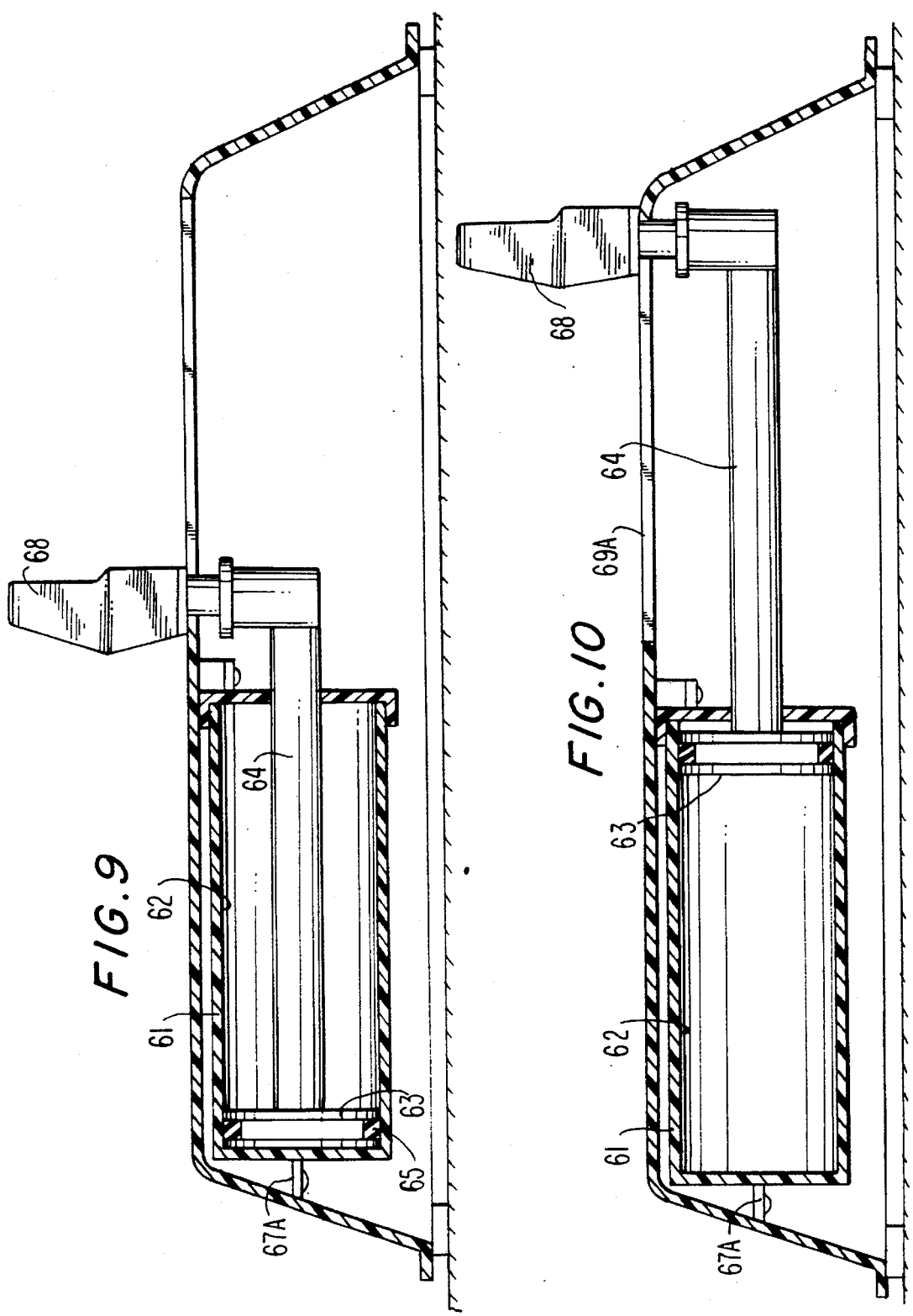

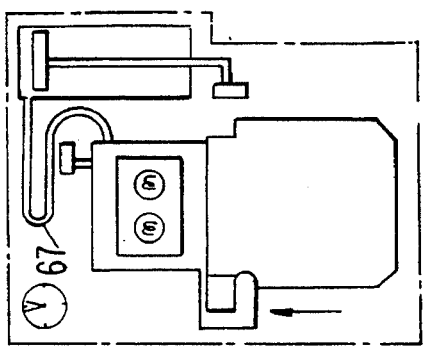
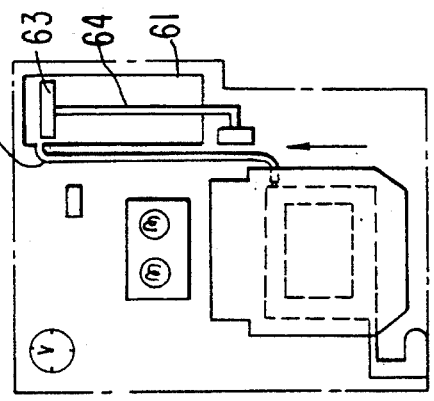
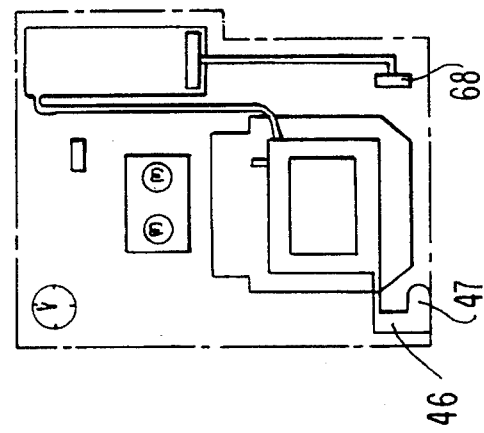
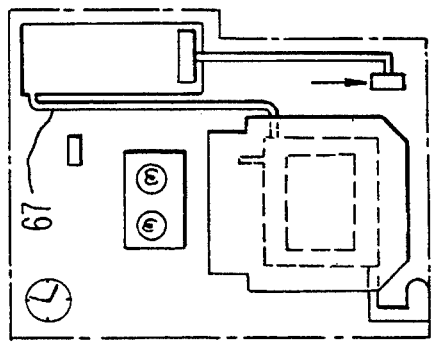
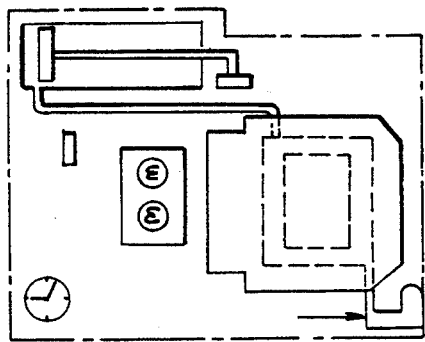

5,453,000

TOY VACUUM MOLDING APPARATUS

BACKGROUND OF THE INVENTION

This invention is in the field of toy apparatus and method operable by a child for making vacuum formed articles. Typically a thin sheet of plastic such as colored styrene or metalized poly-vinylchloride is placed over or adjacent a mold of a predetermined shape; the plastic sheet is heated until suitably softened, and then a vacuum is applied through the mold and to the sheet, thereby drawing the sheet to conform to the mold's shape. Finally, the vacuum is released, the formed sheet is separated from the mold, and the child has made a vacuum formed article which may be a complete toy in itself or may be a component of a toy. A toy such as this may provide very significant educational and amusement type benefits.

What must be appreciated here is that this is essentially an industrial process normally conducted by trained adults in a factory setting with all manner of safety procedures and apparatus operators able and willing to follow safety instructions. Ideally, children would be so carefully supervised that dangers from such toys would be insignificant. Unfortunately, children may not be so well supervised, children tend to experiment or do the opposite of what they are told, and injuries may result. Also state and federal statutes are placing higher responsibility on manufacturers to refrain from selling dangerous toys and to pay the consequences of injuries.

Industrial level safety features are either inappropriate for children and/or are so expensive that toys cannot possibly have these features and be marketable at a reasonable price.

The present invention seeks to provide totally appropriate safety features primarily using the apparatus' own structure so that the cost is not significantly increased. Also, this apparatus permits the child operator to be able to safely witness the vacuum forming stage. This has been achieved as shown in the appended drawings and described below.

SUMMARY OF THE INVENTION

This toy invention is a toy vacuum molding apparatus for making toy cars, planes and other articles. This apparatus, operable with a plastic sheet, a mold and a electric power source, includes a housing with spaced apart first and second zones and a shuttle movable between these zones, the shuttle being adapted to hold a mold. The apparatus further includes a heater situated in the second zone and powered by said power source, a vacuum pump including a conduit coupling the pump to the mold, first means to secure a plastic sheet to the mold in a generally airtight manner, second means for moving the shuttle back and forth between the zones, third means for activating the heater while the shuttle is in the second zone, and fourth means for activating the pump to apply a vacuum via the conduit to the mold and heated plastic sheet thereon and thereby vacuum form the plastic sheet into a molded part. The fourth means is operable while the shuttle is situated anywhere in or between the first and second zones. The shuttle is movable back to the first zone where the molded part can be separated from the mold.

This toy has many characteristics of a real or industrial vacuum forming apparatus; however it is to be operated by children. Accordingly, numerous, redundant and failsafe features have been developed to prevent or greatly reduce the possibility of accidents, particularly from heat and/or electricity. Concurrent with these design efforts has been a requirement for economical mass production or else this toy could not be commercially produced.

The principal safety features include means to prevent access to the mold, molded sheet and shuttle when they are still hot, and to prevent access to the heater and the heat lamps, sockets and wiring at any time.

To this end there is a remote probe to activate a deeply recessed on/off power switch, which is further coupled in series to a thermal switch for automatic shut-down if heat is excessive.

A transparent safety lid blocks access to the mold until the shuttle is fully returned to its start position and a thermal lock has determined that the shuttle, mold and plastic piece have sufficiently cooled. A variety of additional locks and latches are incorporated into this apparatus to prevent a child from opening the lid while it is not safe to do so.

A further principal objective of this invention is provision of a toy vacuum forming apparatus where the vacuum can be applied to the plastic while it is still situated adjacent the heater or after it is returned to its start position beneath the transparent safety lid, or anywhere in between these two zones. This overcomes a deficiency in prior art devices where the plastic was moved away from the heater to a separate place before vacuum forming was possible. Such movement often led either to cooling and poor vacuum forming or a need to apply greater or excessive heat to compensate for the cooling.

The novel features and objectives and the resulting new apparatus are described in greater detail below with reference to the preferred embodiments.

BRIEF DESCRIPTION OF THE DRAWINGS

FIG. 3 is a top perspective view of a mold and a flat sheet of plastic prior to molding.

FIG. 4 is a sectional view similar to FIG. 2 with the shuttle frame and the safety cover both in closed position, and with the mold and plastic sheet of FIG. 3 shown situated in the shuttle frame.

FIG. 5 is a sectional elevation view taken along line 5—5 in FIG. 4 with the shuttle frame and the safety cover closed and the shuttle in start position.

FIG. 6 is a sectional elevation view taken along line 6—6 of FIG. 4.

FIG. 8 is a perspective view similar to FIG. 3 showing the mold and the plastic sheet after being vacuum formed.

FIG. 9 is a fragmentary sectional elevation view, with the ends reversed from the structure seen in FIG. 4, and with the vacuum pump lever in set position.

FIG. 10 is a sectional view similar to FIG. 9 with the pump lever returned to start position after the pump has been actuated.

FIGS. 14–18 are a sequence of fragmentary cut-away top plan views showing positions of the shuttle and pump, as follows:

FIG. 14 shows the shuttle in start position and the pump in actuated position.

FIG. 15 shows the shuttle in start position and the pump in set position.

FIG. 16 shows the shuttle in heating position and the pump still in set position.

FIG. 17 shows the shuttle returned to start position and the pump still in set position.

FIG. 18 shows the shuttle in start position and the pump in the actuated position.

DETAILED DESCRIPTION OF THE PREFERRED EMBODIMENT

First Embodiment

Figure 1:
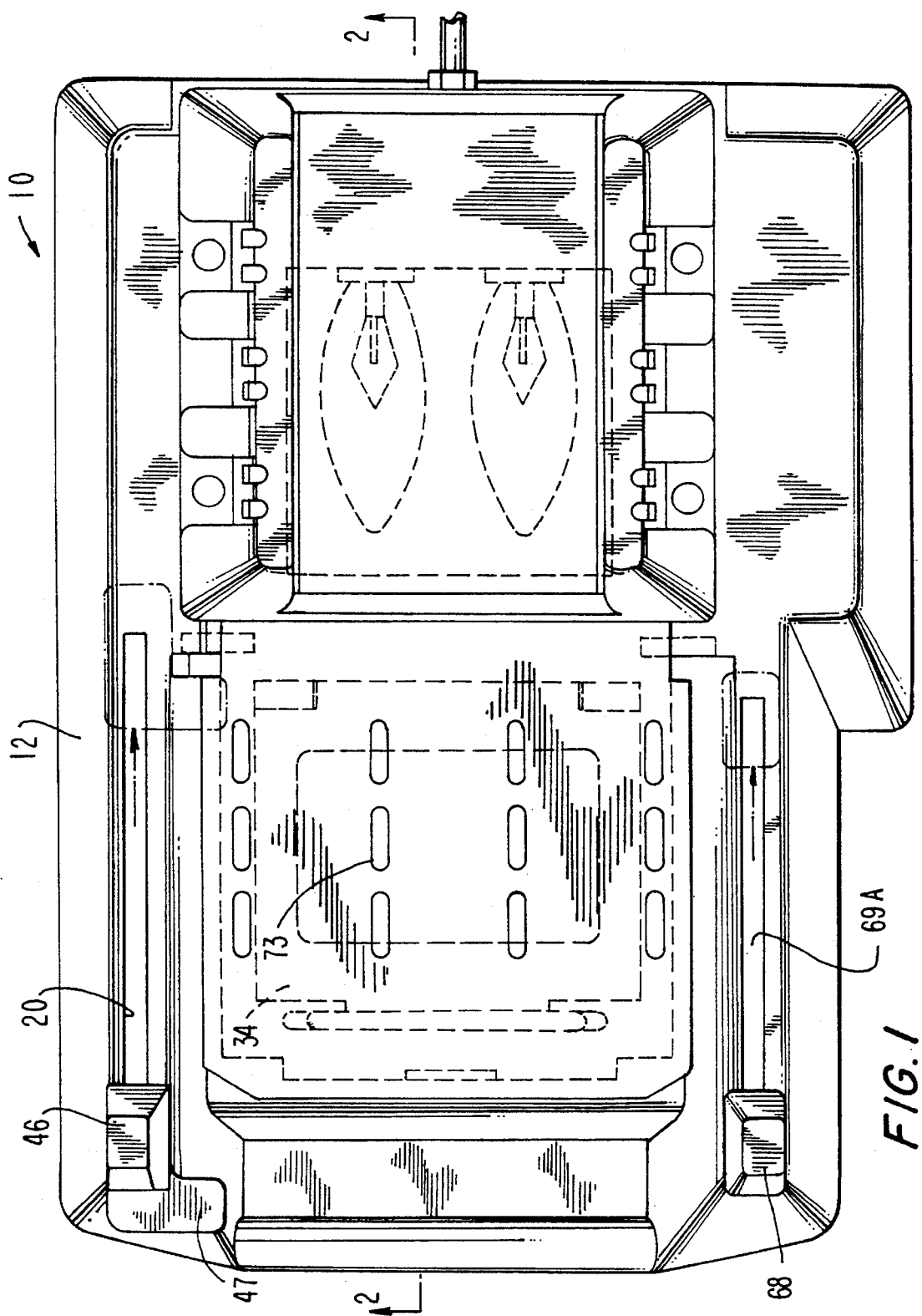
FIG. 1 is a top plan view of the Toy Vacuum Molding Apparatus with the shuttle in start position and the safety cover in closed position.
Figure 11:
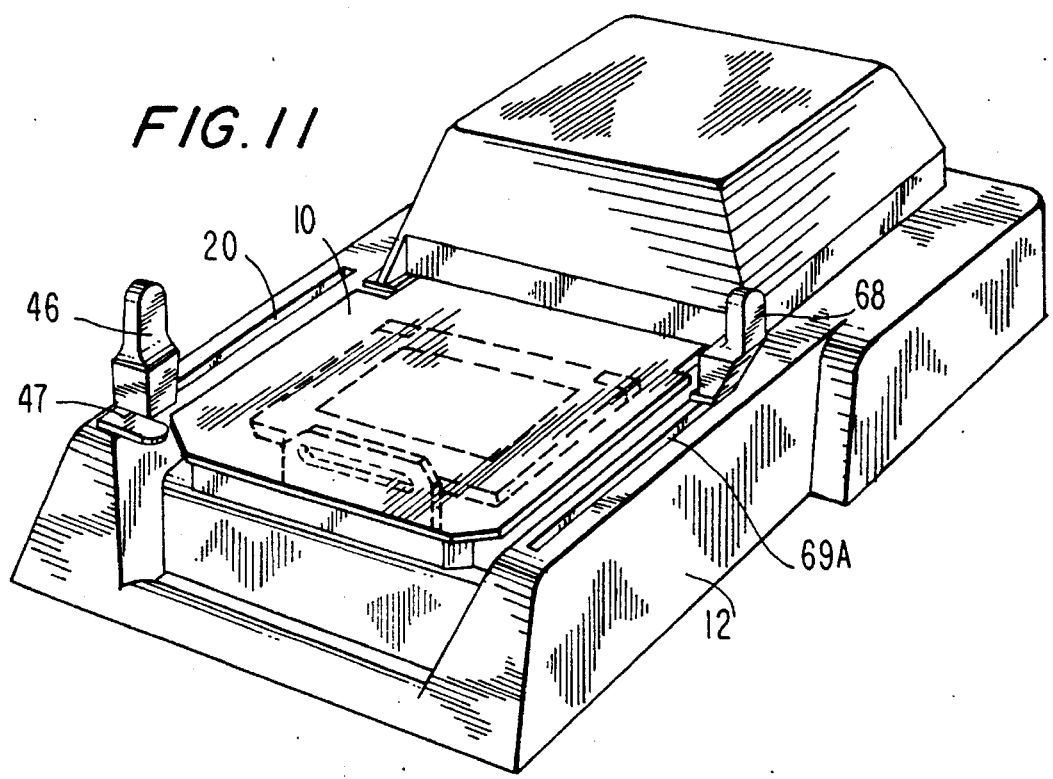
FIG. 11 is a top perspective view of the Toy Vacuum Molding Apparatus corresponding to FIG. 4 with the shuttle frame and safety cover closed, with the shuttle and shuttle lever in start position, and with the pump lever moved to its set position corresponding to FIG. 9.

The new toy vacuum molding apparatus 10 is shown in top plan view in FIG. 1, in top perspective view in FIG. 11 and in a side sectional view in FIG. 4. The principal components of this apparatus are a housing 12, a shuttle 30, a heater 50, a pump 10, a safety lid 70, a mold 80, and a plastic sheet 90 to be molded.

A. Housing and Shuttle

Figure 7:
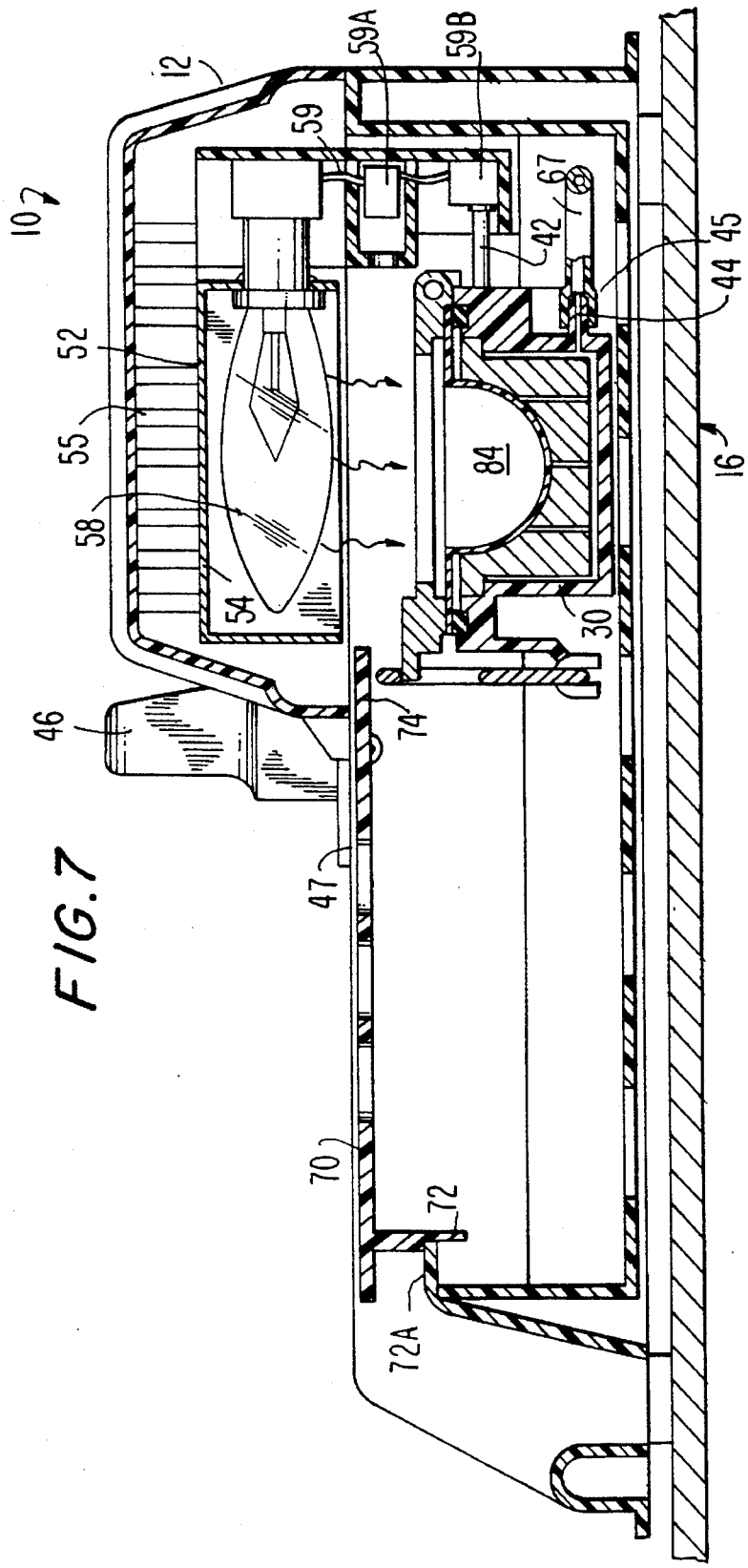
FIG. 7 is a sectional elevation view similar to FIG. 4, but with the shuttle moved to its second or heating position.

In FIGS. 1, 4 and 11 the shuttle 30 is shown in its start position or first zone 14. The shuttle comprises a box 32 for holding a mold and a frame or lid 34 shown in closed position. Box 32 is made of PET plastic, and frame 34 is made of ZINC diecast Zamak®. Throughout this specification, any materials mentioned may have substitutes that are functionally equivalent for the use intended. In FIG. 4 the safety lid 70 is also in closed position. The apparatus 10 has an overall housing 12 of polypropylene material with guide rails or tracks 18 upon which the shuttle 30 moves between its start position 14 as shown and in its heating position 16 which is illustrated in FIG. 7 where shuttle 30 is situated below heater 50. The shuttle 30 is a generally rectangular box structure 32 seen best in FIG. 4 in side sectional view, and in FIG. 5 as an end sectional view. The shuttle has runners 33 which slide along tracks 18 whereby the shuttle is easily moved between its start and heating positions.

Prior to operation a mold 80 is placed within the cavity of the shuttle, the mold is dimensioned to fit easily but securely within the shuttle box 32.

On the left side of the shuttle and the apparatus as seen in FIGS. 1, 11 and 5, is a shuttle lever 46 which has its lower part 46A secured to the shuttle so that movement of the lever drives the shuttle between its start and heating positions, this lever moves in its own guide track 48; the lever has an extension tab 47 as seen in FIGS. 5 and 11 which functions with one of the safety features as discussed below.

Thus the housing 12 has two sets of tracks, namely tracks 18 on left and right sides on which the shuttle 30 is guided and moves between its start and heating positions, and tracks 20, 69A on the left and right side in which the shuttle lever 46 and the pump lever 68 (described below) slide also. The shuttle lever 46 moves simultaneously with the shuttle; the pump lever 68 moves independently of the shuttle lever 46 and only when the operator wishes to move the pump piston 63 between it set position and its pumped or actuated position.

B. Heater

As seen in FIGS. 1, 2, 4, 6 and 7 the apparatus housing 12 defines an upward projecting roof 51 to enclose heater 50 which includes a box-like reflector 52 with a reflective surface 54 facing downward and inward. The reflector may be made of tin plated sheet steel. At the end of the box are light bulb sockets 56 for receiving heat lamps 58 which cooperate with the reflecting surface 54 to direct heat downward in the direction of arrows A toward the plastic sheet 90 when it is positioned thereunder. At the base of socket 56 extends wiring 59 which runs through a thermal switch 59A and thence through a microswitch 59B and continues via a power cord (not shown). The heater 50 uses a pair of 40 or 60 watt bulbs of the candelabra or flame tip style. The heater causes the temperature of the plastic sheet to reach about 160'–175° F. which is slightly below the melting temperature of this plastic of between 180°–190° F. The thermal switch 59A in series in the electrical circuit is set at a maximum temperature allowed. Excess heat from the heater is partially discharged through apertures 55 in the roof 51 adjacent the heater. The microswitch 59B is actuated only when the rear-end projection 42 of the shuttle engages the microswitch after the shuttle is driven all the way to its heating position. This engagement is shown in FIG. 7 where projection 42 of the shuttle extending rearward thereof has contacted and depressed the push button portion of microswitch. In the preferred embodiment of this apparatus a manual timer (not shown) is provided whereby the operator can set the timer for the desired number of seconds or minutes (typically 3 to 4½ minutes) after the shuttle has been moved to heating position and microswitch has been engaged. Alternatively, there can be incorporated an automatic timer (not shown) which turns off the power after a pre-set time has lapsed.

FIG. 6 further illustrates the heater 50 situated within the heater housing portion 51 of the total housing 12, the heater's reflector box 52 and the light bulbs 58. The box 52 is mounted to the housing by spacer/fastener 53. Also shown in FIG. 6 is shuttle lever 46 where it moves in its guide tracks 20 and the shuttle 30 moves on its own guide tracks 18. FIGS. 1, 4, 7, and 13 also show ventilation apertures 55 in the housing adjacent the heater to help in cooling the apparatus.

C. Pump

The pump 60, as seen in FIGS. 6, 9 and 10, consists essentially of a cylinder 61, a piston 63 secured to the end of piston rod 64 with piston seal 65 around piston 63 engaging the bore 62 of the cylinder. The piston and cylinder may be made of ABS and the seal of PVC. Movement of the pump lever 68 from the set position shown in FIG. 9 to the activated position shown in FIG. 10 creates a partial vacuum of about 22 inches of mercury in space 61A behind the piston of FIG. 10. This vacuum is applied via a hose 67 connected to the fitting 67A at the rear end of the pump which hose is curved to create certain slack and extends to and engages a fitting 45 at the bottom rear of the shuttle 30. The hose is preferably of a PVC material. This fitting 45 communicates via duct 44 which opens into the bottom of the shuttle box 32. As seen in FIG. 4 the vacuum created at the fitting 45 through duct 44 is applied to the series of openings or aperture 83 in the mold 80. More specifically, these passages 83 create a partial vacuum in the cavity 84 below the sheet of plastic 90 which is drawn down into that cavity 84 to conform to the shape thereof.

The plastic sheet or card 90 is a high impact styrene of 20 gauge thickness. FIG. 3 shows the plastic sheet 90 before vacuum forming in its original flat state, and FIG. 8 shows the same sheet 91 vacuum form into the shell of body portion of a toy car. As seen in FIG. 8 the shell 91 includes two small holes 92 in the front for headlights, a line 93 down the side representing the hood of the car, and further lines for doors and windows of the car. The lip portion 94 of the vacuum formed article is subsequently is cut away by the child, and wheels and other accessories may be added.

Figure 2:
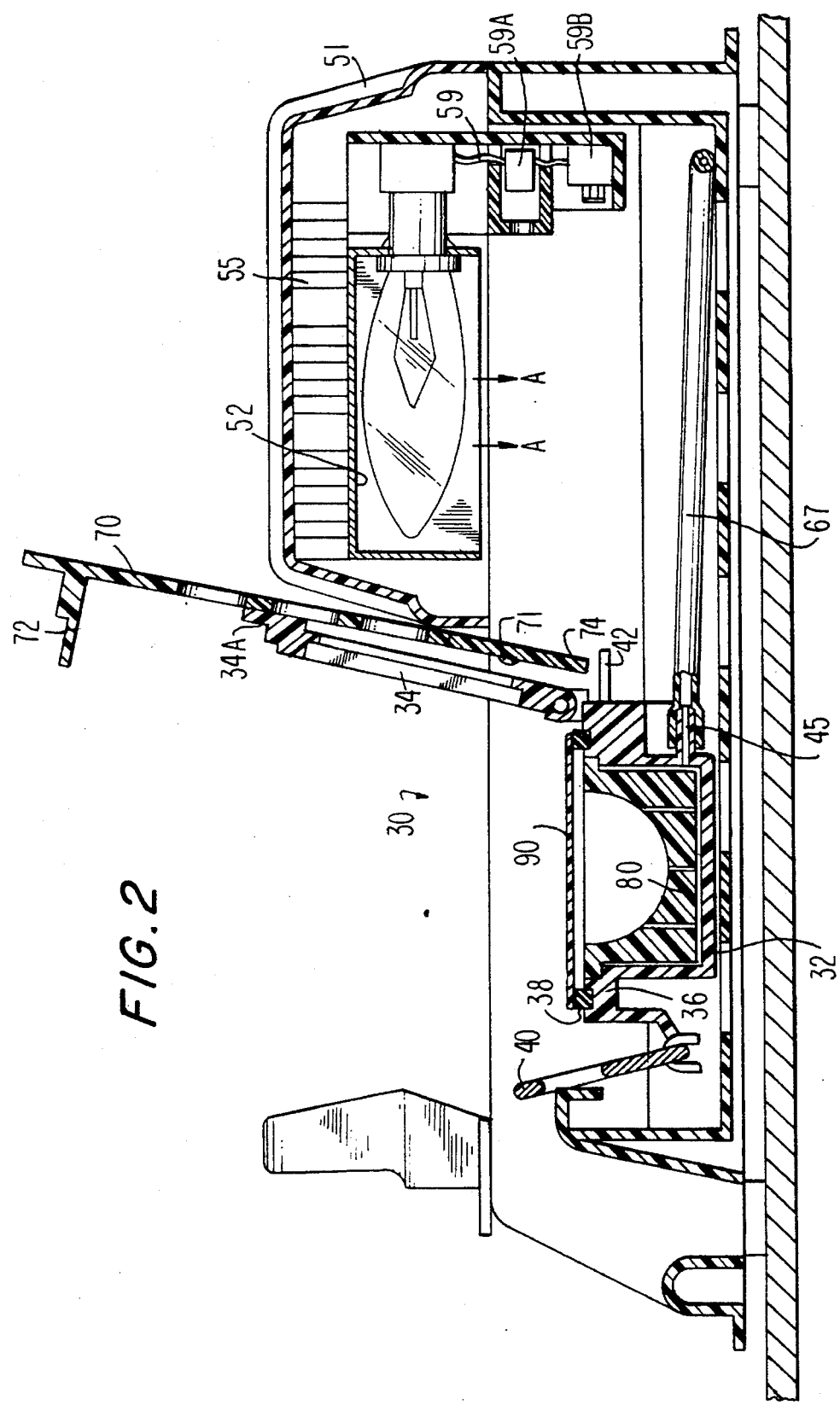
FIG. 2 is a sectional elevation view taken along line 2—2 in FIG. 1, with the shuttle still in start position, the safety cover in open position, and the shuttle frame also in open position.

The hose 67 for the vacuum pump 60 is shown in FIG. 2 and also shown in FIGS. 14–18, this hose being flexible and long enough so that it can remain attached regardless of whether the shuttle is in its start position or in its heating position. Accordingly, the vacuum can be applied to the shuttle while it remains below the heater 50 and immediately after the heating phase, or the vacuum can be applied after the shuttle has been moved forward to its start position at which time the operator can visually observe the vacuum forming at the time he operates the pump.

Figure 12:
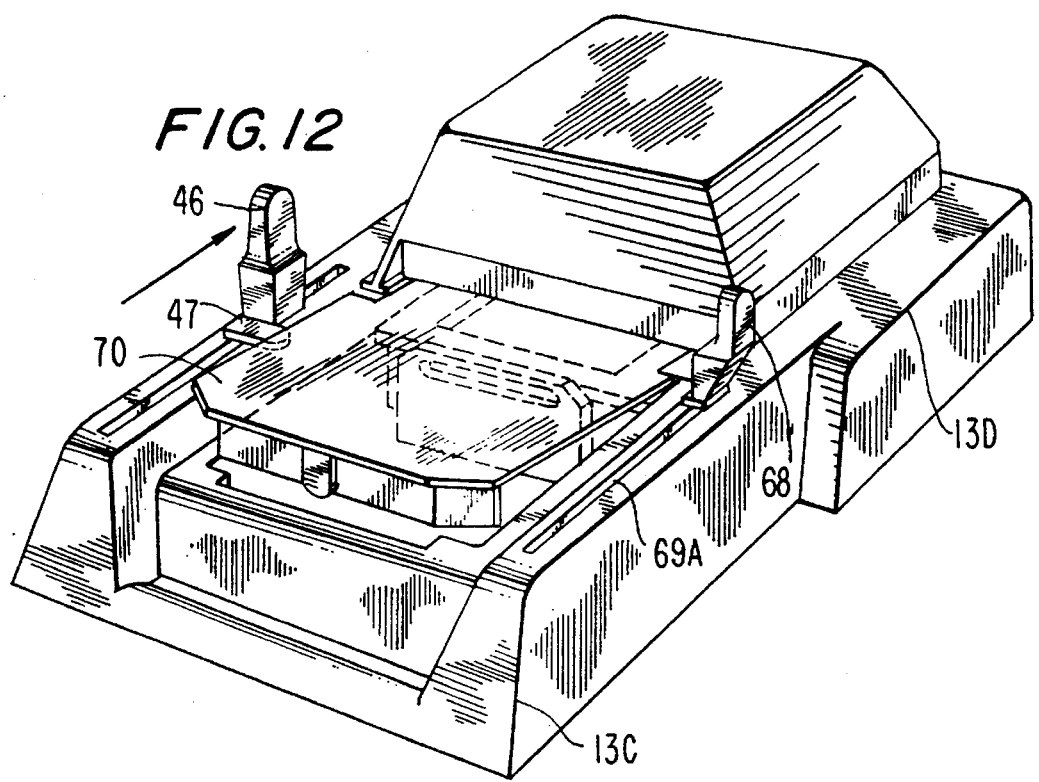
FIG. 12 is a top perspective view similar to FIG. 11 with the shuttle and shuttle lever moved toward the heating position, and the pump lever in set position.
Figure 13:
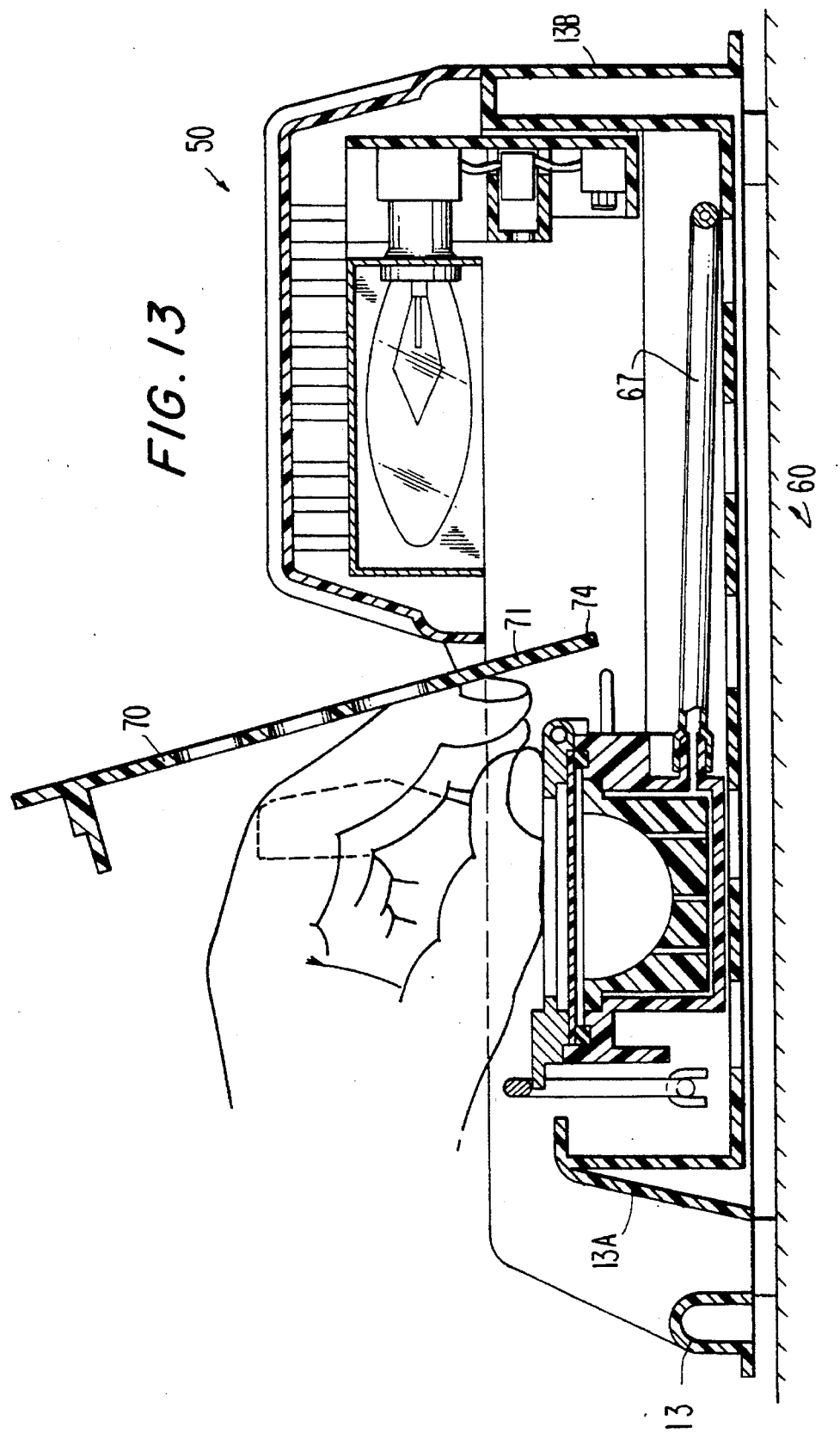
FIG. 13 is a fragmentary sectional view showing the shuttle in its start position, and with the safety cover open and blocking entry of a child's finger toward the heater.

The apparatus housing 12 has adequate strength and stiffness by the use of rib and beam structure 13, 13A, 13B seen in FIGS. 4 and 13 and 13C, 13D in FIG. 12, all of which may be incorporated into the original housing at the time of its manufacture by injection molding or other techniques.

D. Loading the Shuttle

FIGS. 2 and 4 show the box-like shuttle container 32 which receives the mold 80. At the top of the shuttle is a frame 34 in open position hingedly attached to the box 32. The plastic sheet 90 is position atop the mold and lies against the mold seal 38 which is essentially a rectangular or half-round strip or o-ring of PVC base material and secured in the groove 36 of the shuttle box 32. When the plastic sheet 90 is positioned down against the seal 38, the frame 34 is pivoted down against the sheet pressing it tightly against the seal and establishing a relatively airtight situation in that area. Latch 40 also pivotally attached to the shuttle box is then swung to engage lid 34A of the frame and tightly hold it down against plastic sheet which is thus secured and sealed to the shuttle. The seal is a plastic or rubber material which will not deteriorate with the cyclic heat and cyclic pressure applied as this apparatus is used.

After the frame 34 of the shuttle is pivoted down and latched securely, then the safety cover 70 is also pivoted down where its downward projecting latch tab 72 releasably engages lip 72A as seen in FIG. 7 so as to resiliently keep the safety lid down but rendered easily openable. FIG. 1 shows ventilation apertures 73 in cover 70 to help cool the plastic sheet and the shuttle when they are returned to the start position beneath the cover. This cover is made of polycarbonate.

E. Heating and Vacuum Forming

With both the shuttle frame 34 secured down and the safety cover 70 closed, then the apparatus is ready for vacuum forming operation as further described below. The pump lever 68 or the shuttle lever 46 may be moved first, since they are independent of each other. Preferably the pump lever is moved first to its set position so that it may be ready to draw or vacuum after the shuttle lever has moved the shuttle to the rear or heat position and heating has begun. As discussed earlier, movement of the shuttle lever 46 drives the shuttle in its tracks to its heating position where its projection 42 engages the microswitch 59B and starts the heater for the determined time period. Then as seen in FIGS. 14–18 the shuttle is moved forward to its start position, followed by forward movement of pump lever which applies a vacuum to the plastic sheet while it is beneath the safety cover 70 and visible to the operator to see the vacuum forming operation occur. Also as mentioned earlier, the vacuum can be drawn according to FIG. 16 while the shuttle is still in it heating position beneath the heater and before the plastic sheet has had an opportunity to begin cooling.

The safety lid 70 has a rearward projection 74 below its pivot point 71. This projection 74 extending downward when the cover 70 is open affectively prevents a child's fingers from entering the interior and touching the heater.

As long as the shuttle lever 46 remains in the actuated position, its safety tab 47 will be positioned above the safety cover 70 and prevent the cover from being pivoted upward. The shuttle lever 46 in FIG. 11 has been moved forward and no longer serves to bar opening of the safety cover 70. FIG. 5 also shows the safety tab 47 on the shuttle lever, and FIG. 2 shows that both levers have been moved forward to allow the safety cover to pivot upward.

F. Safety Features

Since safe operation is a principal objective herein the apparatus' numerous safety features are summarized below.

1. The heater is remote from the shuttle's start position; thus the heater is removed from the exposed loading and unloading area of the mold.

2. The heater is inaccessible to the operator's fingers. If the cover is closed there is no access to the shuttle or the heater. If the cover is open its safety tab blocks fingers from reaching the heater. If shuttle is in its start position the shuttle is a partial barrier to the heater; if shuttle is in heating position the shuttle largely blocks heater.

3. The safety cover is blocked from being opened when the shuttle lever has driven the shuttle to its heating position by the shuttle lever's safety tab situated above the cover.

4. The housing has air vents adjacent the heater for cooling. Also the safety cover has air vents to help cool the shuttle and the molded plastic when the shuttle is moved back to its start position below the cover.

5. The shuttle cannot be moved to the heater or to the microswitch to activate the heater while the safety cover is open, because the cover's safety tab extending downward blocks such movement of the shuttle.

6. If the cover is only partially down and its safety tab partially up, the shuttle could be moved partially toward the heater; however the shuttle lever would jam on the partially open cover.

7. In final stage after vacuum forming and return of the shuttle to its start position and after the safety cover is lifted, the user must unlock the latch holding the frame down against the plastic sheet.

8. The thermal switch prevents overheating in the heater.

9. The timer warns against excessive heating time.

G. Apparatus Advantages

The advantages of this new apparatus are many.

1. It has numerous and redundant safety features to reduce the possibility of injury to children operators.

2. It is simple to operate.

3. It operates well and has a high efficiency mode to allow vacuum forming at the moment heating has ended without any time delay due to moving the mold and heated plastic to a new location.

4. It is sufficiently economical to manufacture that it may be practical as a commercial product.

5. It permits the operator to see the vacuum forming operation through a window while not sacrificing the many safety features.

The vacuum forming toy apparatus described above may be constructed in various ways using alternative materials and structural features while still being within the spirit and scope of the invention as defined in the appended claims. Alternate or other commercially available heaters and vacuum pumps may be used. Any appropriate mold may be positioned in the shuttle and a variety of plastic sheet material may be selected for vacuum forming. The main housing of this apparatus is shown as a single injection molded part; however, numerous alternative manufacturing methods of assemblies of parts are feasible.

Second Embodiment

A second embodiment of the above-described invention shown primarily in FIGS. 19–21 has many features the same as the first embodiment, and a few that are different as explained below. The repeated features include the housing, the shuttle, the heater and the pump. The differences include modified electrical circuitry and switches, a new handle, indicator lights for the condition of the heat lamps, and the major difference is in the safety lid and safety features to assure that a child user cannot open the lid before the mold is sufficiently cooled.

FIGS. 19–23 show the toy vacuum molding apparatus 100 with the housing 101, shuttle 102, mold 103, shuttle lever 104, heater 105, heat lamps 106, heater reflector housing 107, pump (not shown) and pump hose 108.

Figure 20:
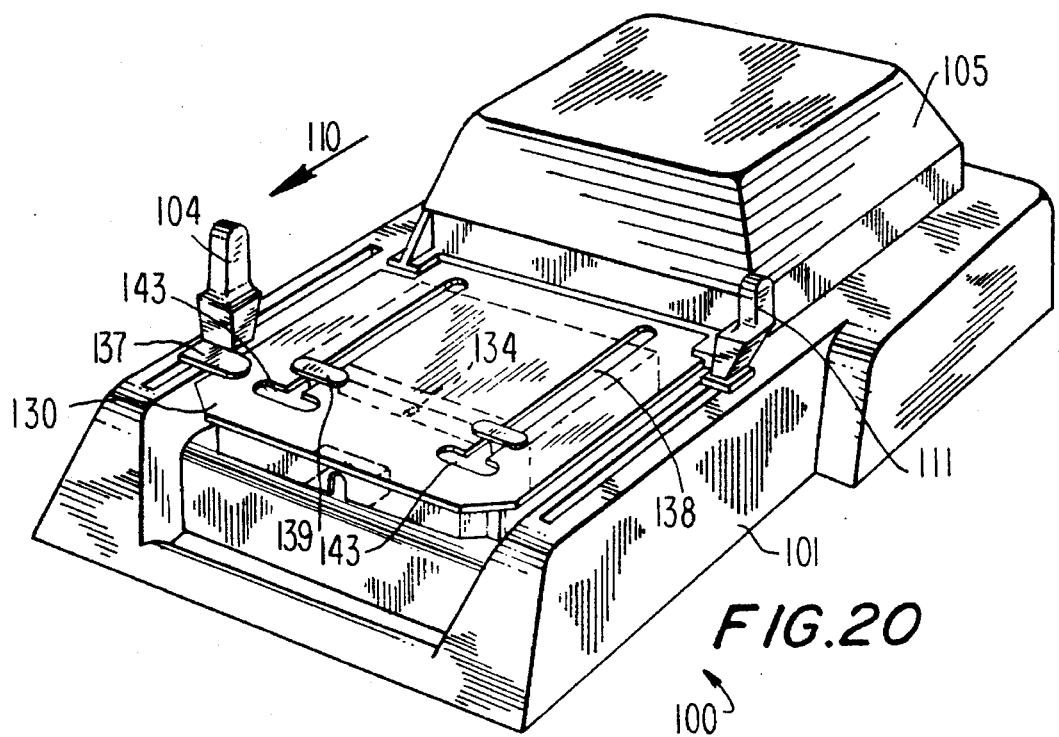
FIG. 20 is a perspective view similar to FIG. 19 showing the safety lid closed and the shuttle moved slightly toward the heater.
Figure 21:
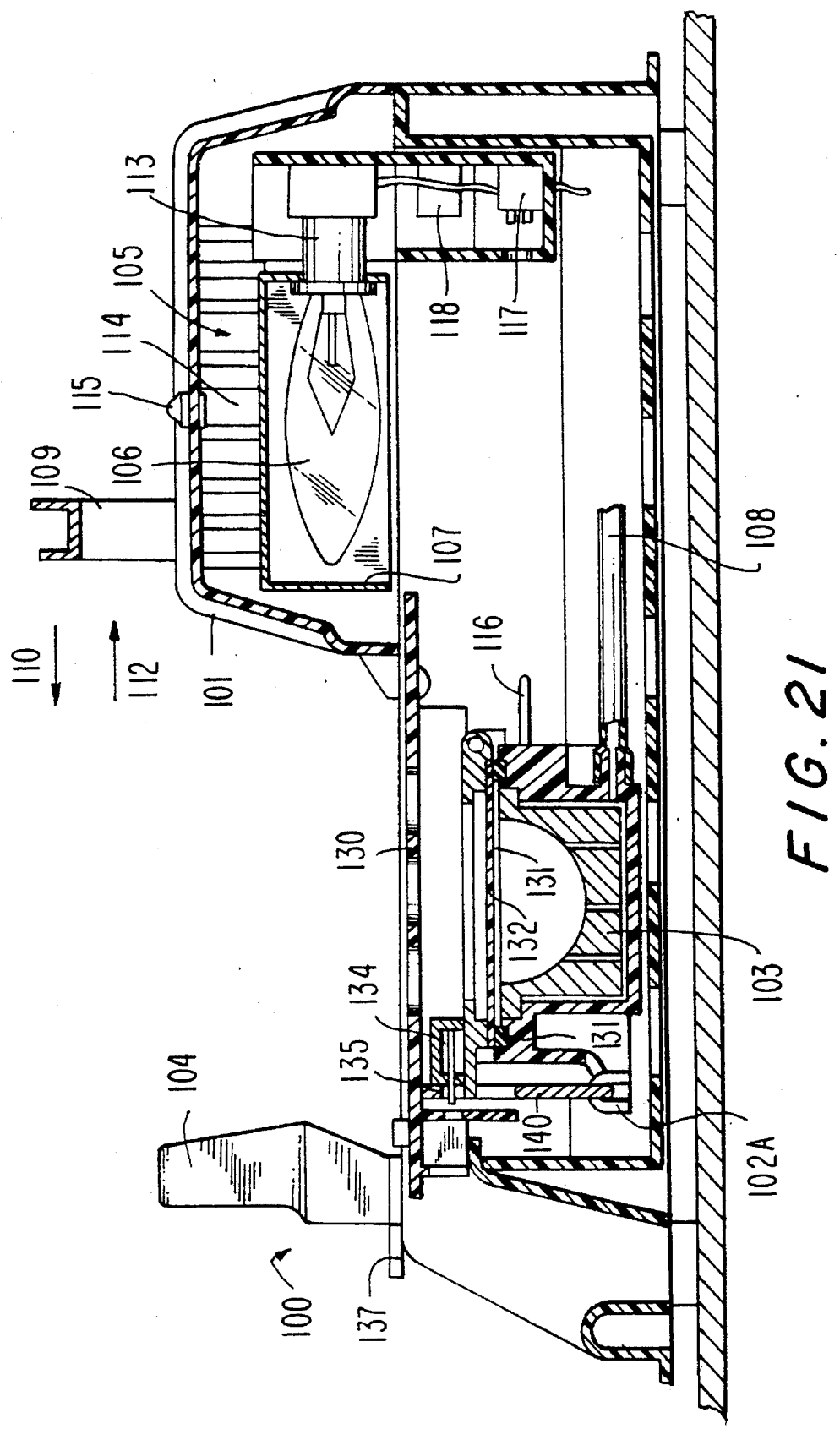
FIG. 21 is a fragmentary sectional view of the embodiment of FIG. 20.

A handle 109 is provided that is mounted to the housing and extends over and bridges the heater (see FIG. 21). When a user pulls either the shuttle lever 104 or the pump lever 111 (see FIGS. 19–21) in the direction of arrow 110 (see FIG. 21), he/she can brace the housing by pushing on handle 109 in the opposite direction, shown by arrow 112 in FIG. 21. Due to the location of handle 109 the pulling force on lever 104 is generally balanced by the opposite force on handle 109.

The heater 105 has a pair of heat lamps 106, each in a separate socket 113. Since these lamps are enclosed within the reflector housing 107 a user would be unaware if one or both lamps failed to illuminate even though the operation switches were closed. To solve this problem a small aperture 114 is provided through the reflector housing above each lamp. Directly above this aperture is a light transmission element 115, such as glass, high temperature plastic, or even optical fiber. If the heat lamp is on and illuminated, its light can be seen through aperture 114 and through or via light indicator 115. Should an indicator be unilluminated the user would be thus signaled to replace the lamp or determine what other problem may exist.

The shuttle 102 has a dual probe 116 extending rearward from its rear end. FIG. 21 shows a side view of only one of the dual probes. When the shuttle is moved from its load position as seen in FIG. 21 to its heat position, the probes 116 enter or engage and turn on dual microswitches 117 which are in series and close the power circuit to energize the heat lamps. In series with the on/off microswitches is a thermal (bi-metallic or tri-metallic) safety switch 118. Should the heater become excessively hot, heat will be transmitted to switch 118 which will turn off power until an acceptable lower temperature is reached.

Lastly, is a modified safety lid 130 and shuttle frame structure. The shuttle 102 has a hinged frame 131 which pivots down to capture a sheet of plastic 132 that will be vacuum formed. One of numerous safety features herein is a thermal switch 133 comprising a bi-metallic leaf spring and lock pin 134 combination located at the front edge of the shuttle frame, front being the direction away from the heater. The operation of this lock pin will be discussed shortly.

Figure 19:
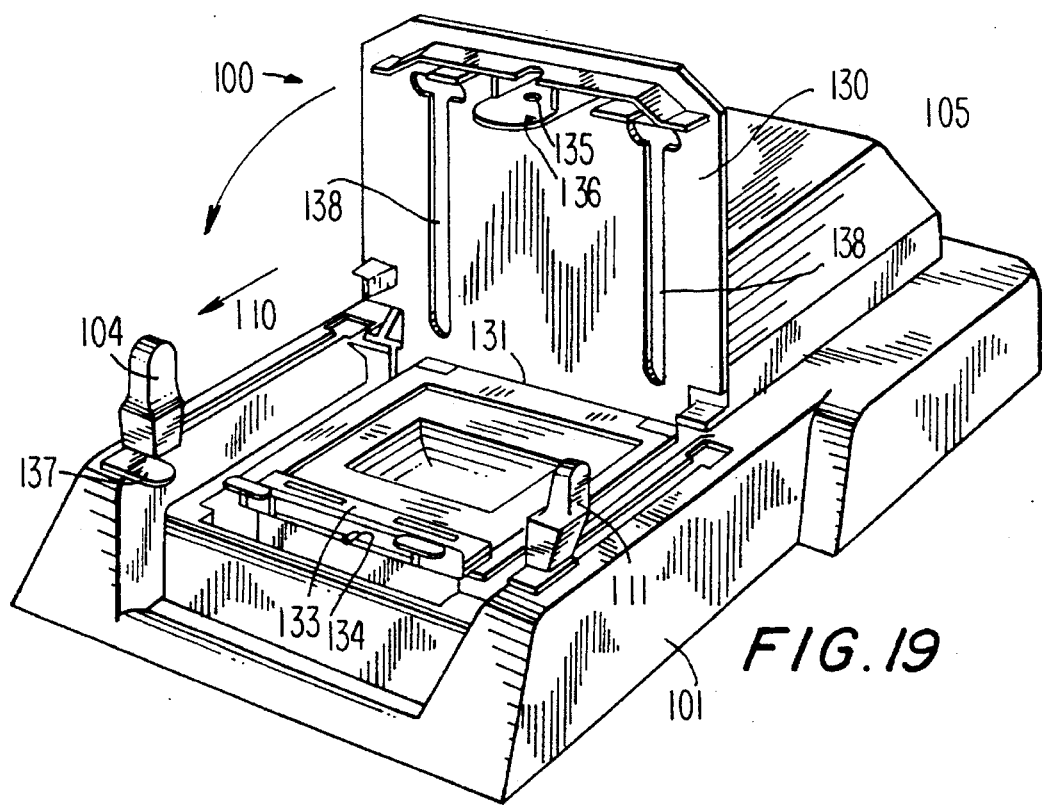
FIG. 19 is a perspective view of a second embodiment showing the safety lid open.

Above the shuttle in its load position in FIG. 21 is a safety lid 130; this lid pivots between its closed position in FIG. 21 and its open position in FIG. 19. Extending downward from lid 130, as best seen in FIG. 19, is a tab 136 with aperture 135 which aligns with lock pin 134 when the lid is closed and the shuttle is moved to the left. When the shuttle frame 131 is hot due to a recent heating phase, the spring of switch 133 deforms moving pin 134 axially forward and into aperture 135. While the pin remains in this aperture the safety lid 130 cannot be lifted and thus the hot frame 131 and the hot mold remain inaccessible to fingers of child operators. Cooling typically takes about seven minutes for the pin to retreat.

This second embodiment includes from the first embodiment the previously discussed safety tab 137 extending laterally from shuttle lever 104. Any amount of movement of the shuttle lever 104 rearward from its start position causes tab 137 to override safety lid 130 and prevent it from being opened. The pin 134 of thermal switch 133 supplements and complements the shuttle lever's safety tab.

A still further safety feature is provided to prevent a child from defeating safety pin 134. To overcome this safety lock one would have to move pin 134 axially rearward and out of aperture 135. The top of the pin is not accessible to be pushed axially; however, one might try to move the whole shuttle rearward. This would obviously move the shuttle frame carrying the pin and defeat the lock.

Figure 22:
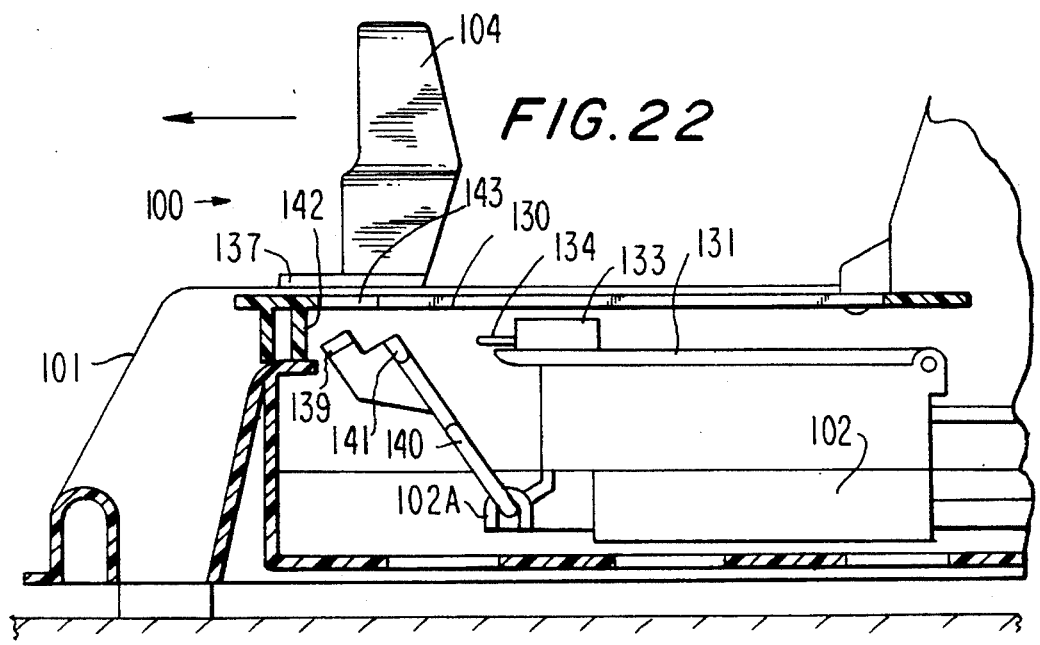
FIG. 22 is a fragmentary sectional view showing the latch pivoted off the shuttle frame.
Figure 23:
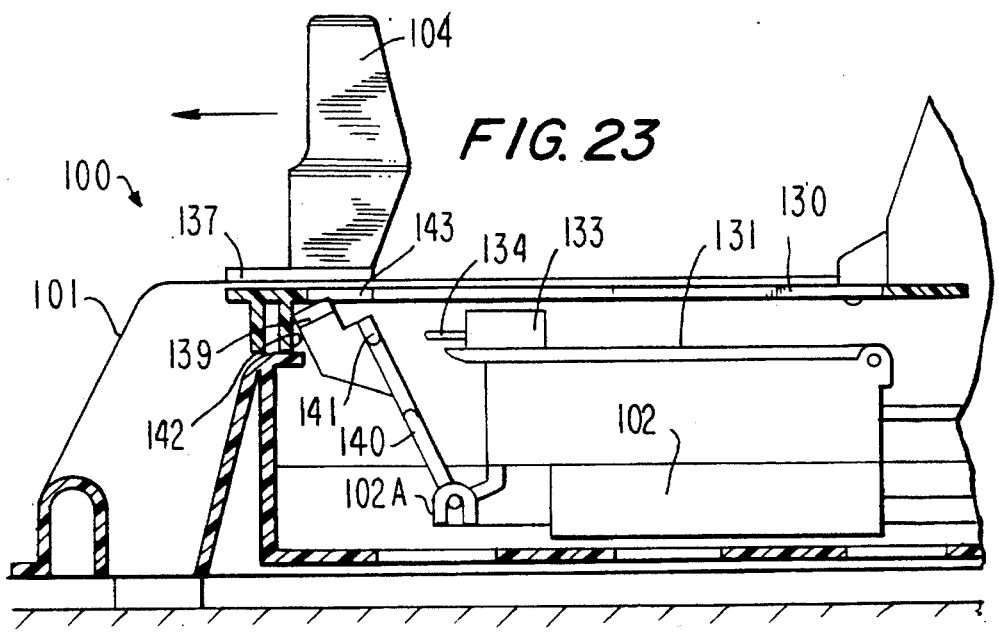
FIG. 23 is similar to FIG. 22, showing the latch being cammed upward.

To prevent this problem there is a further lock structure formed by a pair of slots 138 in the safety lid 130 that cooperate in the tabs 139 atop latch 140 which pivots up to a vertical position to latch and hold down the shuttle frame 131, as described earlier in connection with the first embodiment. Latch 140 is pivoted about hinge part 102A of the shuttle, as seen in FIG. 21–23, and is carried by the shuttle during shuttle movement. Thus, when latch 140 is pivoted up to engage and hold down shuttle frame 131, it normally remains so engaged until it is manually pivoted off the front edge of frame 131. If the shuttle is fully to the left (forward) in load position and latch 140 is vertical and engaged to frame 131, then safety lid 130 may be pivoted down and the elongated aperture 143 at the end of each slot 138 may receive through it a tab 139 atop latch 140. Subsequently, when the shuttle is moved rearward (to the right) tabs 139 slide in slots 138 overlying lid 130.

Should latch 140 come loose as seen in FIG. 22, it will be driven back to its vertical position when the shuttle is returned to the left by a camming action of surface 142 on the rear side of the downward tab of safety lid 130, as further seen in FIG. 23. When tabs 139 atop the latch 140 rise they enter elongated aperture 143 at the front end of long slots 138 in the safety lid. Any further rearward movement of the shuttle simultaneously and similarly moves these tabs 139 in slots 138. Since tabs 139 extend transversely of and overlie slots 138, and since tabs 139 are connected to the latch which is carried by, pivots on, and is a part of the shuttle, the safety lid cannot be lifted. This condition remains until the shuttle and tabs 139 are returned fully forward, which then returns lock pin 134 into aperture 135. Pin 134 continues to prevent opening of lid 130 until the shuttle and mold are sufficiently cool for the thermal element to retract the pin.

The tabs 139 also serve to prevent defeating of the shuttle lever tab 137, as tabs 139 hold down lid 130 against attempts to twist, distort or otherwise maneuver it from under shuttle lever tab 137. A further benefit from slots 138 in lid 130 is further ventilation for faster cooling of the mold and shuttle components.

One further new feature is an application of gray high temperature paint or enamel on the top surface of the plastic sheets or blanks that are molded by this vacuum forming apparatus; alternatively the sheets may comprise a coextrusion or laminate of a gray layer with a colored layer. With this toy children can make, for example, toy cars or at least toy car bodies, each in the color of the plastic sheet. Since the mold is a cavity, the side of the sheet drawn into the mold becomes the exposed outside surface of the toy. Thus the color of the bottom side of the sheet determines the color of the toy. The opposite side of the sheet is exposed to the heat from the light box.

This opposite side becomes the inside surface of the car body and essentially is unseen after molding is completed, thus it does not matter what color it is. Plastic sheets of various colors are normally provided to allow the user their choices.

It has been discovered that the different colors on otherwise identical sheets of plastic significantly affect the heat absorption or the time required to properly heat the blank, because the heat is at least partially from a light source. Thus if a child determines that exactly two minutes of heating time are required to produce a good vacuum formed red car body, such knowledge may be incorrect to make a good black car body.

To reduce this problem we have applied a gray paint to the heat-receiving upper surface of the colored cards (plastic sheets). As mentioned earlier, this gray surface will not be seen after the car body is formed, or at least as an interior surface it will hardly be seen.

Figure 24:
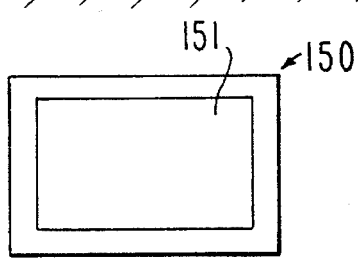
FIG. 24 is a schematic view of a plastic sheet or card to be vacuum formed.
Figure 25:
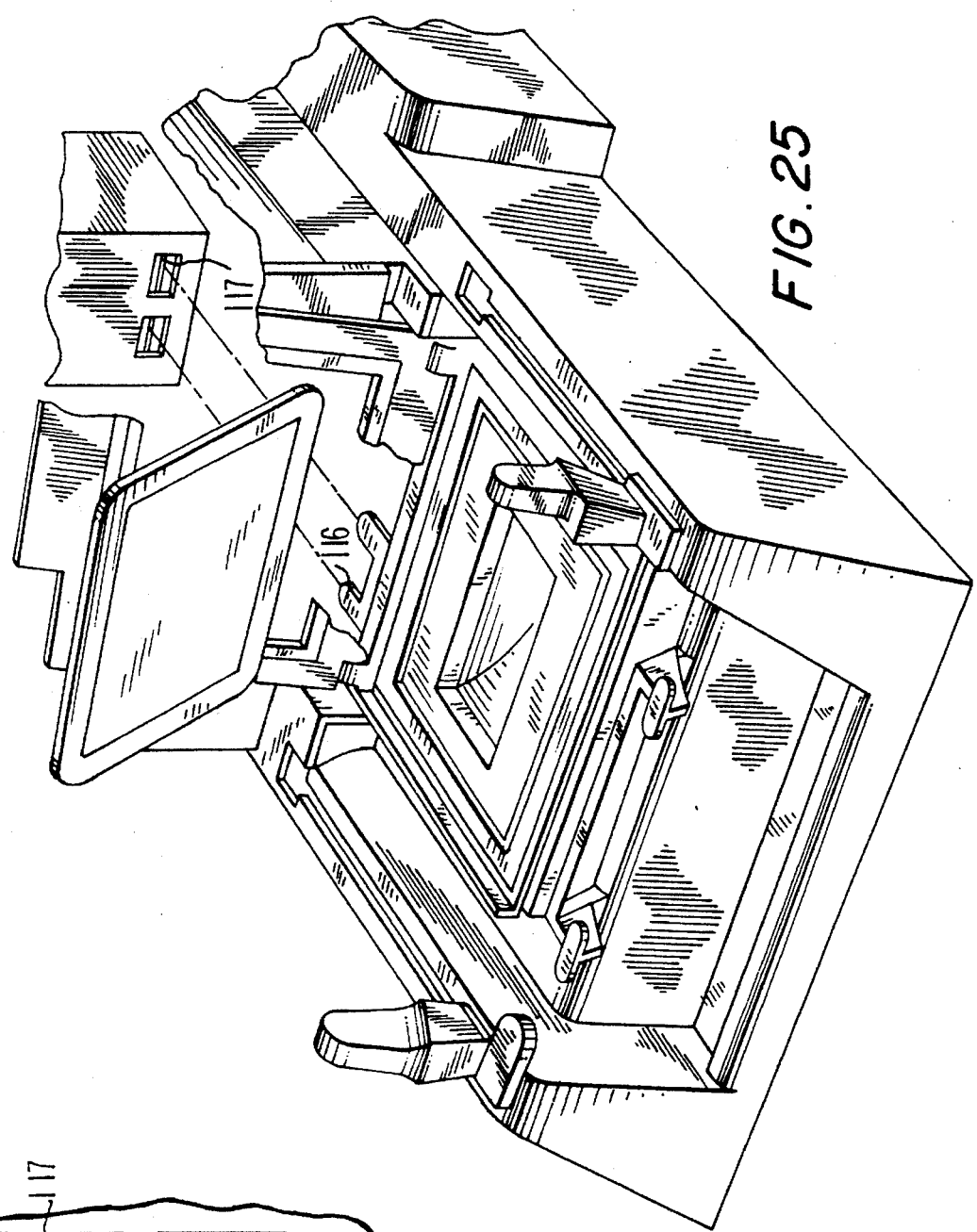
FIG. 25 is a fragmentary perspective view corresponding to FIG. 19.
Figure 26:
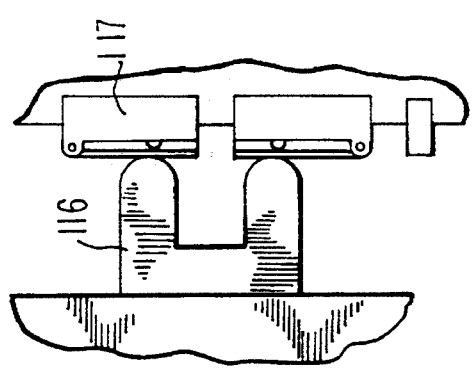
FIG. 26 is a fragmentary plan view showing the dual projections rearward of the shuttle adjacent dual microswitches.

The shuttle frame 130 is somewhat like a picture frame or mask in that it covers and holds down the peripheral edges of the blank while leaving all the surface interior of the frame exposed to the heater. Since the gray painted surface softens from the heat it would be undesirable for this to be in pressure contact with the frame. Thus, the gray paint has been applied only to the area that falls inward of the frame and not under the frame. FIG. 24 shows a typical plastic sheet or blank 150 whose length and width dimensions correspond to those of the shuttle frame. The inner rectangle 151 represents the gray painted area of the top side of this card and corresponds to the interior frame dimension. In FIG. 21 a card represented by reference number 132 is held down by the shuttle frame 131 against and atop the mold 103.

Any or all of the features described with respect to this second embodiment may be used with the first embodiment.

The above-described embodiments of this invention may take a variety of other forms still within the spirit of this invention and within the scope of the claims appended hereto.

I claim:

1. A toy apparatus operable with a plastic sheet, a mold and a electric power source, the apparatus comprising a housing which includes spaced apart first and second zones, a shuttle movable between these zones, the shuttle adapted to hold a mold, a heater situated in the second zone and powered by said power source, a vacuum pump including a conduit coupling the pump to the mold, first means for securing a plastic sheet to the mold in a generally airtight manner, second means for moving the shuttle back and forth between said zones, third means for activating the heater while the shuttle is in said second zone, and fourth means for activating the pump to apply a vacuum via the conduit to the mold and heated plastic sheet thereon and thereby vacuum form the plastic sheet into a molded part, said fourth means being operable while said shuttle is situated anywhere in or between said first and second zones, said shuttle being movable back to the first zone where the molded part can be separated from the mold.

2. A toy apparatus operable with a plastic sheet, a mold, and a electric power source, the apparatus comprising a housing which includes spaced apart first and second zones, a shuttle movable between these zones, the shuttle adapted to hold a mold, a heater situated in the second zone and powered by said power source, a vacuum pump including a conduit coupling the pump to the mold, first means for securing a plastic sheet to the mold in a generally airtight manner, second means for moving the shuttle back and forth between said zones, third means for activating the heater while the shuttle is in said second zone, and fourth means for activating the pump to apply a vacuum via the conduit to the mold and heated plastic sheet thereon while the shuttle, mold and plastic sheet are in the second zone adjacent the heater and thereby vacuum form the plastic sheet into a molded part, said shuttle being movable back to the first zone where the molded part can be separated from the mold.

3. A toy apparatus operable with a plastic sheet, a mold and a electric power source, the apparatus comprising a housing which includes spaced apart first and second zones, a shuttle movable between these zones, the shuttle adapted to hold a mold, a heater situated in the second zone and powered by said power source, a vacuum pump including a conduit coupling the pump to the mold, first means for securing a plastic sheet to the mold in a generally airtight manner, second means for moving the shuttle back and forth between said zones, third means for activating the heater while the shuttle is in said second zone, and fourth means for activating the pump to apply a vacuum via the conduit to the mold and heated plastic sheet thereon and thereby vacuum form the plastic sheet into a molded part, said fourth means being operable while said shuttle is situated anywhere in or between said first and second zones, said shuttle being movable back to the first zone where the molded part can be separated from the mold, wherein the apparatus further comprises a safety cover situated in the first zone, this cover movable between a closed position which blocks access to the shuttle when it is in the first zone and an open position that allows access to the shuttle.

4. Apparatus according to claim 3 wherein said cover is transparent and permits viewing of the plastic while sheet being vacuum formed when the shuttle is in the first zone.

5. Apparatus according to claim 3 wherein said cover pivots between its open and closed positions, and said cover has a tab portion that projects when the cover is open, to block the shuttle from being moved from said first to said second zone.

6. Apparatus according to claim 3 wherein said cover pivots between its open and closed positions, said cover has an upper surface, said second means for moving said shuttle has a safety tab which lies closely adjacent said top surface of the cover when the cover is closed and said second means and the shuttle are moved to said second zone, whereby said safety tab blocks said cover from opening until said second means is returned to its first position.

7. Apparatus according to claim 3 wherein said cover is movable between its open and closed positions, and said second means has blocking means for blocking said cover from opening when said second means is moved to drive the shuttle to the second zone, whereby said second means blocks said cover from opening until said second means and shuttle are returned to said first position.

8. Apparatus according to claim 3 wherein said cover has ventilation apertures therethrough to allow air movement to help cool said shuttle and molded plastic thereon when they return to said first position.

9. Apparatus according to claim 1 wherein said third means comprises an electrical on/off switch, and said shuttle has a switch activator which can engage and activate said on/off switch only when the shuttle has moved fully to said second zone.

10. Apparatus according to claim 9 wherein said on/off switch is situated in said second zone and said activator is a projection from said shuttle.

11. Apparatus according to claim 1 wherein said pump comprises a piston within a cylinder, and said conduit is a flexible hose.

12. Apparatus according to claim 6 wherein said pump comprises a piston within a cylinder, and said conduit is a flexible hose.

13. Apparatus according to claim 1 wherein said shuttle in normal operation is movable horizontally between said first and second zones.

14. Apparatus according to claim 13 wherein said heater is situated above and adjacent said shuttle when the shuttle is in said second zone.

15. Apparatus according to claim 1 wherein said housing further comprises tracks in which said shuttle moves between zones.

16. Apparatus according to claim 11 wherein said fourth means for activating said pump is a lever for driving said piston, and said pump lever and piston are movable between a set position and activated position.

17. Apparatus according to claim 1 wherein said first means is carried by said shuttle.

18. Apparatus according to claim 3 further comprising a thermal safety latch having cooperating first and second parts, one carried by said safety cover and the other carried by said shuttle or by said first means, said safety latch first part being movable between an extended position when heated and a retracted position when cool, whereby when said shuttle is in said first zone and said first part is in a heated condition, said first part moves to its extended position and engages said second part, and when said first part is cool it retracts and becomes disengaged from said second part, said first and second parts when engaged to each other maintaining said safety cover in its closed position, and when disengaged permitting said safety cover to be moved to its open position.

19. Apparatus according to claim 18 wherein said first part comprises a bimetallic spring.

20. Apparatus according to claim 18 wherein said first part is a bimetallic spring with a projecting element and said second part includes a recess or aperture into which said element engages.

21. Apparatus according to claim 1 further comprising externally visible means on said housing for indicating if said heater have been activated.

22. Apparatus according to claim 1 wherein said heater is situated inside said housing and comprises at least one lamp.

23. Apparatus according to claim 22 further comprising indicator means carried by said housing for providing a visible indication when said lamp is on.

24. Apparatus according to claim 23 wherein said indicator means comprises a plastic or glass light transmitting element having a first surface exposed to said lamp and an opposite second surface visible from outside said housing.

25. Apparatus according to claim 24 wherein said heater comprises a chamber formed of a wall with a reflective inner surface and an aperture in said wall through which light from said lamp is visible, and said indicator means carried by said housing having said first surface facing said aperture.

26. Apparatus according to claim 25 wherein said indicator means comprises a fiber optic element.

27. Apparatus according to claim 1 wherein said first means comprises (a) a frame that is carried by said shuttle and is movable from open position to a closed position where it holds a plastic sheet tightly against a mold carried by said shuttle, and (b) a latch carried by said shuttle for releasably securing said frame in its closed position.

28. Apparatus according to claim 3 wherein said third means comprises an electrical on/off switch, and said shuttle has a switch activator which can engage and activate said on/off switch only when the shuttle has moved fully to said second zone.

29. Apparatus according to claim 3 wherein said pump comprises a piston within a cylinder, and said conduit is a flexible hose.

30. Apparatus according to claim 3 wherein said shuttle in normal operation is movable horizontally between said first and second zones.

31. Apparatus according to claim 30 wherein said heater is situated above and adjacent said shuttle when the shuttle is in said second zone.

32. Apparatus according to claim 30 wherein said mold in said shuttle receives and holds the plastic sheet on the top of the mold, said safety cover is situated adjacent and above said shuttle and plastic sheet when the shuttle is in said first zone.

33. Apparatus according to claim 3 wherein said housing further comprises tracks in which said shuttle moves between zones.

34. Apparatus according to claim 29 wherein said fourth means for activating said pump is a lever for driving said piston, and said pump lever and piston are movable between a set position and activated position.

35. Apparatus according to claim 3 wherein said first means is carried by said shuttle.

36. Apparatus according to claim 3 further comprising externally visible means on said housing for indicating if said heater has been activated.

37. Apparatus according to claim 3 wherein said heater is situated inside said housing and comprises at least one lamp.

38. Apparatus according to claim 37 further comprising indicator means carried by said housing for providing a visible indication when said lamp is on.

39. Apparatus according to claim 38 wherein said indicator means comprises a plastic or glass light transmitting element having a first surface exposed to said lamp and an opposite second surface visible from outside said housing.

40. Apparatus according to claim 39 wherein said heater comprises a chamber formed of a wall with a reflective inner surface and an aperture in said wall through which light from said lamp is visible, and said indicator means carried by said housing having said first surface facing said aperture.

41. Apparatus according to claim 40 wherein said indicator means comprises a fiber optic element.

42. Apparatus according to claim 3 wherein said first means comprises (a) a frame that is carried by said shuttle and is movable from open position to a closed position where it holds a plastic sheet tightly against a mold carried by said shuttle, and (b) a latch carried by said shuttle for releasably securing said frame in its closed position.

43. Apparatus according to claim 42 wherein said safety cover has a slotted aperture of first width terminating in an opening of greater width, and said latch has an upward extending stem of width slightly less than said first width and a terminal end of width greater than said first width and less than said second width, whereby said stem and terminal part can extend upward through said opening, and said stem can move laterally in said slot while said terminal part slides above said slot but cannot descend into said slot.

44. Apparatus according to claim 3 further comprising further safety means carried by said shuttle for preventing said safety cover from being opened any time said shuttle is moved from its first zone position.

45. Apparatus according to claim 3 wherein said pump comprises a piston within a cylinder, and said conduit is a flexible hose.

46. A toy apparatus operable with a plastic sheet, a mold, and a electric power source, the apparatus comprising a housing which includes spaced apart first and second zones, a shuttle movable between these zones, the shuttle adapted to hold a mold, a heater situated in the second zone and powered by said power source, a vacuum pump including a conduit coupling the pump to the mold, first means for securing a plastic sheet to the mold in a generally airtight manner, second means for moving the shuttle back and forth between said zones, third means for activating the heater while the shuttle is in said second zone, and fourth means for activating the pump to apply a vacuum via the conduit to the mold and heated plastic sheet thereon while the shuttle, mold and plastic sheet are in the second zone adjacent the heater and thereby vacuum form the plastic sheet into a molded part, said shuttle being movable back to the first zone where the molded part can be separated from the mold, said apparatus further comprising a safety cover situated in the first zone, this cover being movable between a closed position which blocks access to the shuttle when it is in the first zone and an open position that allows access to the shuttle.

* * * * *